United States Patent
Firchau et al.

(10) Patent No.: US 9,574,703 B2
(45) Date of Patent: Feb. 21, 2017

(54) HAND-HELD OR VEHICLE MOUNTED CAMERA STABILIZATION SYSTEM

(71) Applicant: FREEFLY SYSTEMS, INC., Redmond, WA (US)

(72) Inventors: Tabb Firchau, Redmond, WA (US); David Bloomfield, Redmond, WA (US); Shane Colton, Redmond, WA (US); Ian Roper, Snohomish, WA (US)

(73) Assignee: FREEFLY SYSTEMS, INC., Woodinville, WA (US)

( * ) Notice: Subject to any disclaimer, the term of this patent is extended or adjusted under 35 U.S.C. 154(b) by 0 days.

(21) Appl. No.: 14/912,138

(22) PCT Filed: Aug. 15, 2014

(86) PCT No.: PCT/EP2014/067518
§ 371 (c)(1),
(2) Date: Feb. 15, 2016

(87) PCT Pub. No.: WO2015/022433
PCT Pub. Date: Feb. 19, 2015

(65) Prior Publication Data
US 2016/0201847 A1    Jul. 14, 2016

Related U.S. Application Data

(60) Provisional application No. 61/866,440, filed on Aug. 15, 2013.

(51) Int. Cl.
*F16M 11/04* (2006.01)
*G03B 17/56* (2006.01)
(Continued)

(52) U.S. Cl.
CPC ............. *F16M 11/041* (2013.01); *B60R 11/04* (2013.01); *F16M 11/048* (2013.01);
(Continued)

(58) Field of Classification Search
None
See application file for complete search history.

(56) References Cited

U.S. PATENT DOCUMENTS

| 8,861,947 | B2 * | 10/2014 | Webb ................... | H04N 5/2328 396/421 |
| 2005/0185089 | A1 * | 8/2005 | Chapman ............... | F16M 11/04 348/375 |

(Continued)

FOREIGN PATENT DOCUMENTS

WO    2005024507 A2    3/2005

OTHER PUBLICATIONS

International Search Report & Written Opinion issued in International Patent Application No. PCT/EP2014/067518 mailed on Dec. 5, 2014.

*Primary Examiner* — W B Perkey
(74) *Attorney, Agent, or Firm* — Talem IP Law, LLP

(57) ABSTRACT

A stabilization system or gimbal having a mounting arrangement (3) for a camera providing for rotation about pan, roll, and tilt axes (210, 230, 220) where tilt and roll axis (220, 230) position can be independently adjusted is described. The arrangement can be configured so that when adjusting the stabilization frame relative to the roll axis, adjustment of the camera COG relative to the tilt axis is inhibited. The system can further be arranged such that when adjusting the roll axis, adjustment relative to the tilt axis is inhibited. Similarly, when adjusting the pan axis, adjustment to the tilt or roll axes may be inhibited.

20 Claims, 5 Drawing Sheets

(51) Int. Cl.
*B60R 11/04* (2006.01)
*F16M 11/20* (2006.01)
*F16M 11/24* (2006.01)
*F16M 13/04* (2006.01)
*B60R 11/00* (2006.01)

(52) U.S. Cl.
CPC ....... *F16M 11/205* (2013.01); *F16M 11/2085* (2013.01); *F16M 11/24* (2013.01); *F16M 13/04* (2013.01); *G03B 17/561* (2013.01); B60R 2011/004 (2013.01); F16M 2200/041 (2013.01); F16M 2200/044 (2013.01)

(56) References Cited

U.S. PATENT DOCUMENTS

| | | | |
|---|---|---|---|
| 2010/0079101 A1 | 4/2010 | Sidman | |
| 2014/0099092 A1* | 4/2014 | Di Leo | G03B 17/563 396/420 |
| 2016/0201847 A1* | 7/2016 | Firchau | F16M 11/041 224/567 |

* cited by examiner

HAND-HELD OR VEHICLE MOUNTED CAMERA STABILIZATION SYSTEM

BACKGROUND TO THE INVENTION

This invention relates generally to camera stabilization systems and more particularly to an improved lightweight hand-held or vehicle-mounted camera stabilization system, for use in photographic or video-related applications.

In many applications, including film production and consumer industries, high quality, lightweight and highly portable photographic or video equipment is now available to a wide range of users. Increases in the quality of the images produced by the equipment can accentuate the effects of any vibration or sudden movement applied to the camera through its mounting systems or through the hands of a user, and so various image stabilization technologies are available to combat these effects. These are especially important when the photographic or video equipment, referred to hereinafter as a camera, which may be a video or stills camera, is used in a moving situation, such as on a boat, airborne vehicle or terrestrial vehicle, since the motion of the mounting system can be unpredictable and can include sudden movements or vibrations translated to it by mounting mechanisms, or by a user. Image stabilization technology can help with the acquisition of high quality stable images, which are substantially free from artifacts resulting from vibrations or sudden movements which occur in a broad range of environmental or action situations. In the past, mechanical stabilizers, lens stabilizers, and electronic image stabilization technologies integrated into cameras themselves have been proposed.

A type of technology that is becoming increasingly prevalent is that of gyro-sensor stabilization. Stabilizing gimbal systems used in this area of technology incorporate 3-axis gyro-sensors to measure tilt, pan, and roll movements and counteract those movements using motors attached to a respective axis.

SUMMARY OF THE INVENTION

The described embodiments of the invention provide for a hand-held or vehicle mounted payload stabilization system. In one embodiment, the present disclosure provides a stabilization system for stabilizing a payload. The system comprises a mounting arrangement adapted for securing the payload within the stabilization system. The mounting arrangement is rotatable about each of a plurality of rotational axes of the stabilization system. A position of the mounting arrangement along a first of the plurality rotational axes is independently adjustable, without affecting a position of the mounting arrangement along a second of the plurality of rotational axes. The position of the mounting arrangement along the second rotational axis is independently adjustable, without affecting the position of the mounting arrangement along the first rotational axis.

DETAILED DESCRIPTION OF PREFERRED EMBODIMENT

Figure 1:
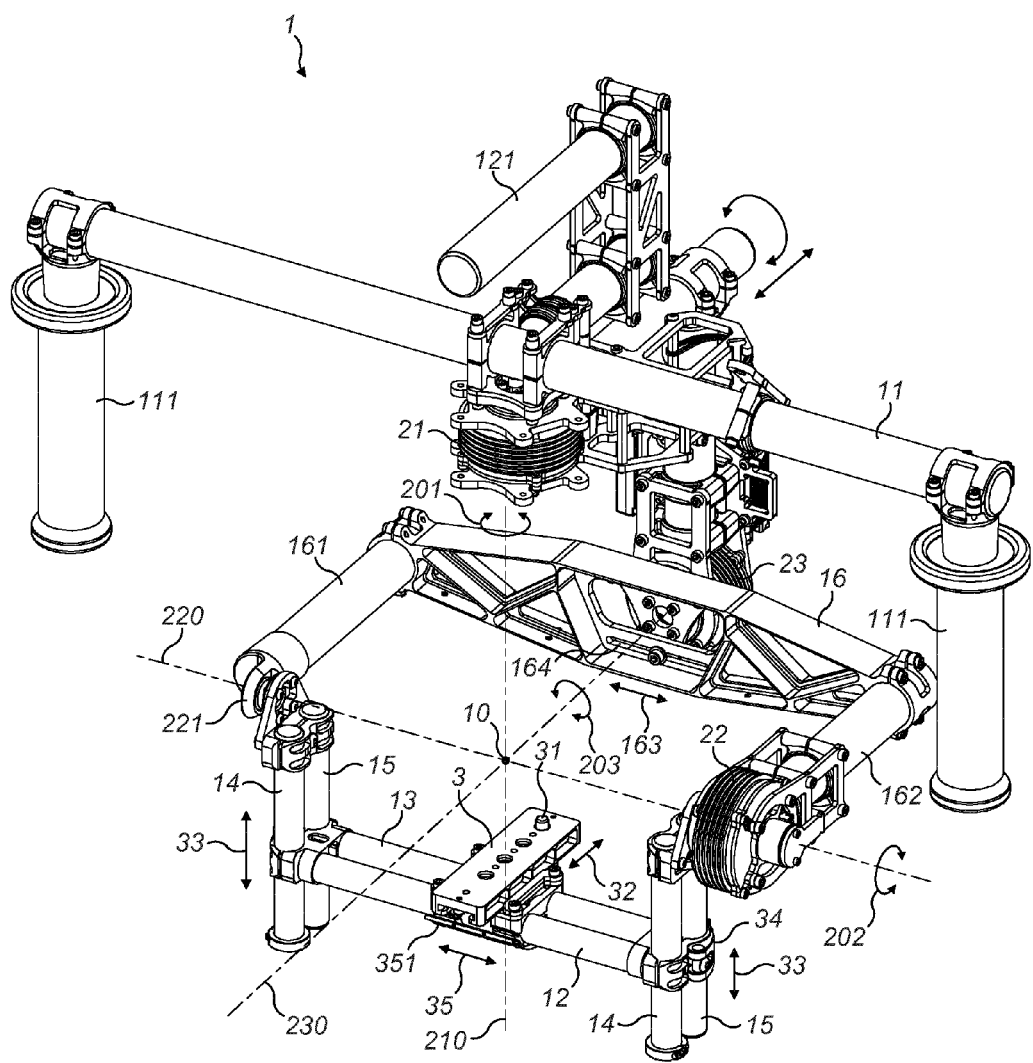
FIG. 1 shows a perspective view of a stabilization system according to some embodiments the invention.

Accurate and reliable adjustability is important in a stabilizing gimbal. Stabilizing gimbals are often used in mobile situations and thus run from mobile power sources such as a battery pack. Power consumption is therefore important. For this reason, it is helpful to configure the gimbal and camera arrangement with passive stability, meaning that the center of gravity (COG) of a payload, such as camera, mounted in the stabilizing gimbal is co-located as closely as possible to a point of intersection of the three axes of tilt, roll, and pan of the system. This means that, in the absence of external disturbance, when the camera is placed in a particular rotational position about the three axes, acceleration forces do not cause the camera to rotate in any particular direction. If such acceleration forces do influence the assembly, then the stabilizing motors of the assembly will have to react to that acceleration force and this can put excessive strain on the motors and/or the power source to which they are connected.

For these reasons, quick, easy, and fine adjustability of the system is important, to allow the COG of the camera or other payload fitted to the assembly to be adjusted independently along each axis to allow a user to rapidly and easily center the COG on the point of intersection of the three axes without a need for multiple adjustments and readjustments.

Embodiments of the invention address in particular the problem of adjustability of the stabilization frame, which may be referred to as a gimbal. Prior known systems have generally been adjustable for different sizes of cameras. The COG of a camera relative to its mounting plate can differ from one model to another and the COG can also be altered by a change of lens, change of battery, or the addition or removal of any peripheral equipment attached to the camera. In prior systems, loosening a part of the frame assembly or gimbal to adjust a movement relative to one axis could very easily induce an unwanted adjustment in another axis. For example, loosening a friction based grip on a circular shaft will allow it to both translate along the shaft, but also rotate around the shaft, and so imparting a translation along the shaft may accidentally, or unintentionally, induce a rotation about the shaft.

To address these issues, the system, according to some embodiments of the invention, provides a mounting arrangement for a payload, such as a camera, which provides for rotation about three axes, generally known as pan, roll, and tilt axes. The arrangement is configured such that at least the position of the mounting arrangement relative to the roll axis can be adjusted without affecting its position relative to the tilt axis, and the position of the mounting arrangement relative to the tilt axis can be adjusted independently of its position relative to the roll axis. Preferably, the relative position of the mounting arrangement to the tilt axis or the roll axis can be adjusted independently of the pan axis, such that an adjustment to tilt and/or roll balance does not affect the pan balance. The term balance used above and herein refers to the centering of the COG of a payload (e.g., a camera) mounted to the device on the relevant axis. Therefore, pan balance refers to centering the COG of the camera mounted on the system on the pan axis, roll balance refers to centering the COG of the camera mounted on the system on the roll axis and, tilt balance refers to centering the COG of the camera attached to the system on the tilt axis. Once adjustments have been made to adjust the pan, roll, and tilt balance for a payload, then passive stability can be achieved.

A mounting arrangement of the system can therefore be arranged so that when a roll balance adjustment means is released for adjustment relative to the roll axis, adjustment of the camera COG relative to the tilt axis is prevented. The system can further be arranged such that when a roll axis adjustment means is released for adjustment, adjustment relative to only the roll axis is permitted and adjustment relative to the tilt axis is prevented, by the configuration of the adjustment means. Similarly, the adjustment means for the pan axis may be configured such that when released, it only allows adjustment relative to the pan axis and not relative to the tilt or roll axes.

In one embodiment, the present disclosure provides a stabilization system for stabilizing a payload. The system comprises a mounting arrangement adapted for securing the payload within the stabilization system, the mounting arrangement rotatable about each of a plurality of rotational axes of the stabilization system, wherein a position of the mounting arrangement along a first of the plurality rotational axes is independently adjustable, without affecting a position of the mounting arrangement along a second of the plurality of rotational axes, and the position of the mounting arrangement along the second rotational axis is independently adjustable, without affecting the position of the mounting arrangement along the first rotational axis.

In some example embodiments, a position of the mounting arrangement along a third rotational axis is independently adjustable, without affecting the position of the mounting arrangement along the first and second rotational axes.

In some example embodiments, for each of the plurality of rotational axes, a position of the mounting arrangement along the axis is independently adjustable, without affecting a position of the mounting arrangement along any other of the plurality of rotational axes.

In some example embodiments, the stabilization system further comprises a first releasable adjustment means configured: while released, to allow an adjustment of the position of the mounting arrangement along the first rotational axis and to prevent adjustment of the position of the mounting arrangement along the second rotational axis, and while engaged, to secure the position of the mounting arrangement along the first rotational axis.

In some example embodiments, the stabilization system further comprises a second releasable adjustment means configured: while released, to allow an adjustment of the position of the mounting arrangement along the second rotational axis and to prevent adjustment of the position of the mounting arrangement along the first rotational axis, and while engaged, to secure the position of the mounting arrangement along the second rotational axis.

In some example embodiments, the stabilization system further comprises a third releasable adjustment means configured: while released, to allow an adjustment of the position of the mounting arrangement along the third rotational axis and to prevent adjustment of the position of the mounting arrangement along the first and second rotational axes, and while engaged, to secure the position of the mounting arrangement along the third rotational axis.

In some example embodiments, the stabilization system further comprises an engaging member supporting the mounting arrangement.

In some example embodiments, the engaging member comprises a first release-lock member configured: while in a first state, to allow the mounting arrangement to move relative to the engaging member along the first rotational axis, and while in a second state, to secure the mounting arrangement relative to the engaging member.

In some example embodiments, while the first release-lock member is in the first state, the mounting arrangement is slidable relative to the engaging member along the first rotational axis.

In some example embodiments, the stabilization system further comprises a lateral member substantially parallel to the second rotational axis and engaged with the engaging member, wherein the engaging member comprises a second release-lock member configured: while in a first state, to enable an adjustment of the position of the mounting arrangement along the second rotational axis by allowing the engaging member to move along the lateral member, and while in a second state, to secure the engaging member relative to the lateral member.

In some example embodiments, while the second release-lock member is in the first state, the position of the mounting arrangement along the second rotational axis is continuously adjustable along a length of the lateral member.

In some example embodiments, the adjustment of the position of the mounting arrangement along the second rotational axis by allowing the engaging member to move along the lateral member provides for a precise adjustment of a roll balance of the payload.

In some example embodiments, the stabilization system further comprises a first down member rotatable about the second rotational axis; a lateral member substantially parallel to the second rotational axis and engaged with the engaging member; and a third release-lock member engaging the lateral member and the first down member.

In some example embodiments, the third release-lock is configured: while in a first state, to enable an adjustment of the position of the mounting arrangement along the third rotational axis by allowing the lateral member to move along the first down member, and while in a second state, to secure the lateral member relative to the first down member.

In some example embodiments, while the third release-lock member is in the first state, the position of the mounting arrangement along the third rotational axis is continuously adjustable along a length of the first down member.

In some example embodiments, the stabilization system further comprises a second down member rotatable about the second rotational axis; and a fourth release-lock member engaging the lateral member and the second down member.

In some example embodiments, the fourth release-lock is configured: while in a first state, to enable an adjustment of the position of the mounting arrangement along the third rotational axis by allowing the lateral member to move along the second down member, and while in a second state, to secure the lateral member relative to the second down member.

In some example embodiments, while the fourth release-lock member is in the first state, the position of the mounting arrangement along the third rotational axis is continuously adjustable along a length of the first down member and the length of the second down member in parallel.

In some example embodiments, the first down member is engaged with a first end of the lateral member and the second down member is engaged with a second end of the lateral member.

In some example embodiments, each of the first down member and the second down member is configured to constrain movements of the lateral member to movements along the down member only.

In some example embodiments, each of the first down member and the second down member comprises at least two parallel tubes.

In some example embodiments, the lateral member is configured to constrain movements of the engaging member relative to the lateral bar to the movements along the lateral bar.

In some example embodiments, the lateral member comprises at least two parallel tubes.

In some example embodiments, the first state is a state of a release-lock member being released and the second state is a state of a release-lock member being engaged.

In some example embodiments, the first state is a state of a release-lock member being engaged and the second state is a state of a release-lock member being released.

In some example embodiments, the stabilization system further comprises a supporting member; and an intersection point release member for securing the supporting member within the system, wherein a release of the intersection point release member enables a shift of a point of intersection of the plurality of axes along the first axis and an adjustment of the position of the mounting arrangement along the first axis by allowing the supporting member to move within the stabilization system along the first axis.

In some example embodiments, the adjustment of the position of the mounting arrangement along the first axis by moving the supporting member along the first axis provides for a coarse adjustment of a roll balance of the payload.

In some example embodiments, the release of the intersection point release member further enables a rotation of the mounting arrangement about the first axis by allowing the supporting member to rotate about the first axis.

In some example embodiments, the supporting member comprises a roll beam defining one or more transverse slots, the intersection point release member configured for insertion in the one or more slots.

In some example embodiments, the supporting member comprises: a bar or a rod, supporting a tilt part and a roll part of the stabilization system.

In some example embodiments, the stabilization system further comprises a second supporting member; and a second intersection point release member for securing the second supporting member within the system, wherein a release of the second intersection point release member enables a shift of the point of intersection of the plurality of rotational axes along the second axis and an adjustment of the position of the mounting arrangement along the second axis by allowing the supporting member to move within the stabilization system along the second axis.

In some example embodiments, the position of the mounting arrangement is continuously adjustable along the second axis while the second intersection point release member is released by sliding the supporting member within the stabilization system along the second axis.

In some example embodiments, the stabilization system further comprises a plurality of motors corresponding to the plurality of rotational axes, wherein each of the plurality of motors enables rotation of the mounting arrangement about the corresponding rotational axis.

In some example embodiments, the plurality of motors are configured to actively stabilize of the payload.

In some example embodiments, the stabilization system further comprises the payload mounted to the mounting arrangement.

In some example embodiments, the stabilization system is configured enable an adjustment of a center of gravity of the payload in relation to the stabilization system by adjusting the mounting arrangement along one or more of the plurality of rotational axes.

In some example embodiments, if the center of gravity of the payload is substantially co-located with a point of intersection of all of the plurality of rotational axes, the stabilization system is passively stable.

In some example embodiments, the stabilization system is adjustable to achieve a passive stabilization state with a mounted payload by independently adjusting the position of the mounting arrangement along one or more the plurality of rotational axes to substantially co-locate a center of gravity of the payload with a point of intersection of all of the plurality of rotational axes.

In some example embodiments, the plurality of rotational axes comprises a tilt axis, a pan axis, and a roll axis.

In another embodiment, the present disclosure provides a method for reaching a state of passive stability in any of the stabilization systems discussed above having the payload secured to the mounting arrangement, the method comprising: adjusting independently, for each of the plurality of rotational axes, a position of the mounting arrangement along the axis, without affecting a position of the mounting arrangement along any other of the plurality of rotational axes.

Turning now to FIG. 1, it shows a 3-axis camera stabilization system 1, also known as a stabilization gimbal, according to some embodiments of the present invention. The system comprises a support frame 11, to which handles 111 may be attached for manual support and manipulation by a user. A secondary frame 121 is attached to the support frame 11 and may be used to attach peripheral devices to the frame or indeed to attach the frame to a vehicle or other support or mount to which the overall system 1 is to be attached.

The illustrated system is equipped with three permanent magnet alternating current (PMAC) motors (also known as brushless DC motors), a pan axis motor 21, a tilt axis motor 22, and a roll axis motor 23. These motors can provide a rotational input in either direction around the pan, tilt, and roll axes of the assembly as shown by arrows 201, 202, and 203, respectively.

The point of intersection of the three axes 10 remains generally fixed regardless of the rotation of any of the three motors 21, 22, and 23. In order for a camera mounted in the stabilization system to achieve "passive stability", then the center of gravity (COG) of the camera should be located at or as near as possible to the point 10 where the three axes intersect.

A camera will generally be mounted to the system by a camera mounting arrangement 3. This is generally in the form of a plate, which may include one or more protrusions 31 for engaging with a corresponding recess on a mounting part of the camera, and various fixing means may be provided for securing the camera to the mounting arrangement 3. Available solutions include screw threads, clips, and slide and lock mechanisms. In order to displace the COG of a camera mounted to the mounting arrangement 3, it is necessary for the mounting arrangement 3 to be displaceable relative to each of the three axes 210, 220, and 230. The displacement of the mounting arrangement 3 relative to each of these axes can be termed balancing, since centering the COG of the camera mounted to the mounting arrangement relative to an axis will render the camera "balanced" with respect to that axis, in that its COG will be at a neutral point relative to that axis, preferably located on the axis, or on a horizontal or vertical plane of the axis.

One of the most critical aspects in achieving high quality active stabilization using a system is obtaining proper balance of the stabilized system. In this way, an important design consideration for a gimbal according to some embodiments of the present invention is how easily the end user will be able to achieve an acceptable level of balance. A compromise must be found between providing a sufficiently lightweight structure so that the system as a whole can be transported by a person for manual use, or by a manned or unmanned airborne vehicle (UAV), or by a terrestrial vehicle. This must be weighed against providing a fast and convenient method of adjusting the system, to provide an acceptable level of balance, which generally equates to an acceptable proximity of the COG of the camera mounted to the assembly to the intersection point 10 of the three axes 210, 220, and 230.

As has been discussed above, prior art systems very often included adjustments which, when loosened for adjustment, would potentially induce differences in balance relative to more than one of the three axes of rotation 210, 220, and 230. The system according to some embodiments of the present invention aims to provide independent adjustability of the mounting arrangement 3 relative to each of the three axes in turn, so that the balancing process is simplified for a user, and an acceptable degree of balance, or proximity of the COG of a camera mounted to the mounting arrangement to the intersection of the three axes 210, 220, and 230, can be achieved, with minimal effort and minimal readjustment of the available adjustment points.

A tilt balance, also referred to as a fore/aft balance, a tilt fore/aft balance, or a fore/aft tilt balance, can be achieved by adjustment of the mounting arrangement 31 in the direction of arrow 32. This plate can be released by a release mechanism (member) as described in more detail with reference to FIG. 4. This releases the plate, allowing it to be slid or otherwise moved in the direction of arrow 32, to move a camera mounted to the plate backwards or forwards in the direction of arrow 32 relative to the tilt axis 220. In this way, a COG can be placed on or as near as possible to the axis 220 or at least in a plane of the two axes 220 and 210. Providing the ability to adjust only this tilt fore/aft adjustment allows for an inexperienced user to easily isolate the tilt balance and quickly achieve an acceptable level of tilt balance before adjusting the balance relative to the other axes. This is an improvement compared to prior lightweight designs in which an adjustment of the tilt fore/aft balance can introduce and unwanted movement of the mounting arrangement 3 relative to other axes. For example, if the mounting arrangement 3 were only mounted to a single cross-member, rather than to the two cross members 12 and 13 illustrated in FIG. 1, then rotation about that single tube may be induced by adjustment of the fore/aft tilt balance if the clamping onto the tube were not sufficiently fixed. The system according to some embodiments of the invention, as illustrated, constrains adjustment when adjusting the tilt fore/aft balance to only the tilt fore/aft balance.

A further mode of adjustment is termed a tilt vertical balance. This is an adjustment of a distance of the mounting arrangement 3 from tilt axis 220 in a direction perpendicular to that axis, which, when the arrangement is in the orientation shown in FIG. 1 could also be regarded as a height balance. This helps a user to adjust the mounting arrangement 3 on the down tubes 14 and 15 in a direction of arrows 33. The mounting arrangement 3 can therefore be slid, or otherwise moved, towards or away from axis 220 to bring the COG of a camera mounted to the mounting arrangement 3 into, or as near as possible to, axis 220, or to a plane of axes 220 and 230. The position of the mounting arrangement 3 is continuously adjustable along the length of the down tubes 14 and 15 to provide a substantially infinite number of selectable positions to achieve the height balance. It should however be understood that the release means 34 (also referred to as a release-lock member) and/or down tubes (members) 14 and 15 can instead be configured to provide for a plurality of pre-defined selectable positions (height positions) along the down tubes 14 and 15 at which the mounting arrangement may be secured.

Increasing the proximity of the COG of the camera mounted to the mounting arrangement 3 to the tilt axis 220 is particularly beneficial as it affects not only the tilt performance in a fore/aft direction, but also the roll performance around axis 230 as well. If the COG is too far from axis 220 or 230 in a direction of axis 210 (which can also be known as a vertical direction where the assembly is in the orientation shown in FIG. 1), then the tilt vertical balance may be top heavy, in that the COG of the camera is above the axis and tends to drop forwards or backwards under the influence of gravity. This can also similarly lead to an imbalance in the roll direction and the camera may also tend to roll left or right under the influence of gravity. Conversely, if the COG is too low relative to axis 220 in FIG. 1, then it will require greater effort from the motors to rotate the assembly around the axes 220 and 230, and thus performance will be affected and power consumption will be increased. The arrangement of the present invention has release means 34 provided at the connection point between the down tubes 14 and 15, and the cross tubes 12 and 13 which, when released, only allow adjustment of the tilt vertical balance and do not permit any adjustment of the other available adjustments in the stabilization system. The release means 34 may be frictional clamping means for any other suitable releasable fixing or engagement means. Adjustment of the position of the mounting arrangement 3 relative to the roll axis 230 is also important to the performance of the system for similar reasons.

To allow for a broad range of sizes and arrangements of cameras, a coarse adjustment of the roll axis can be provided via adjustment of roll beam 16 (also referred to as a supporting member). Roll beam 16 is attached to horizontal members 161 and 162, to which the tilt axis motor 22 and its opposing pivot 221 are attached. To provide a coarse adjustment of the roll balance, also defined as the distance of the COG of a camera mounted to the mounting arrangement 3 from the plane of axes 230 and 210, an adjustment of the position of roll beam 16 relative to axis 230 is provided. This allows the roll beam 16 to be moved in the direction of arrow 163. This adjustment is provided by slidable adjusters 164, which are described in greater detail in relation to FIG. 3 in the following. Release of these adjusters allows the beam 16 to be translated in the direction of arrow 163, perpendicularly to axis 230, without the release of any other degrees of adjustment of the assembly. This coarse adjustment allows the user to pre-set a rough side-to-side position of the mounting arrangement 3 with respect to the axis 230 of the roll motor 23. This allows a user to accommodate cameras or other equipment mounted to the mounting arrangement 3 where the COG may be offset relative to its mounting plate. This can be due to unusual weight distribution or a need to accommodate various accessories. Due to the arrangement of the release means 164, the side-to-side translational adjustment in the plane of axes 220 and 230 is permitted whilst preventing the beam 16 from rotating relative to axis 220. In this way, the roll beam 16 can be subject to translational adjustment while constraining all other adjustments of the assembly.

After the initial coarse roll axis adjustment has been established, the user can adjust the roll balance more precisely using the mounting arrangement 3 side-to-side translational adjustment in a direction of arrow 35. This is done by releasing release means 351 (also referred to a release-lock member) so that the mounting arrangement 3 can slide (or otherwise move or translate) laterally along horizontal crossbars 12 and 13. The position of the mounting arrangement 3 is continuously adjustable along the length of the crossbars 12 and 13 to provide a substantially infinite number of selectable side-to-side positions. It should however be understood that the release means 351 and/or cross bars 12 and 15 can instead be configured to provide for a plurality of pre-defined selectable positions (side-to-side positions) along the cross bars 12 and 13 at which the mounting arrangement may be secured.

Since the mounting arrangement 3 is constrained from rotating about horizontal cross bars 12 and 13, the adjustment is constrained only to a side-to-side adjustment along those cross bars. This is advantageous over prior solutions, where the use of a single beam in place of double beams 12 and 13 would have allowed the mounting arrangement 3 to rotate about such a horizontal cross member while the side-to-side movement in the direction of arrow 35 is adjusted. Again, this isolation of adjustment in a single dimension at one time allows for a quicker, easier, more reliable, and more repeatable adjustment of the roll balance of the system.

Although, as shown, the system 1 employs two horizontal cross bars 12 and 13 to ensure the isolation of adjustment in a single dimension, other arrangements may be employed to achieve the same goal, such as a rod (or a plurality of rods), hollow or non-hollow, with a non-circular profile that restricts adjustments to adjustments along the rod, and corresponding fasteners. Similarly, down tubes (or rods) 14 and 15 may be replaced with a rod (or a plurality of rods), hollow or non-hollow, with a non-circular profile that restricts the adjustment to adjustments along the rod only, and corresponding fasteners.

Figure 2:
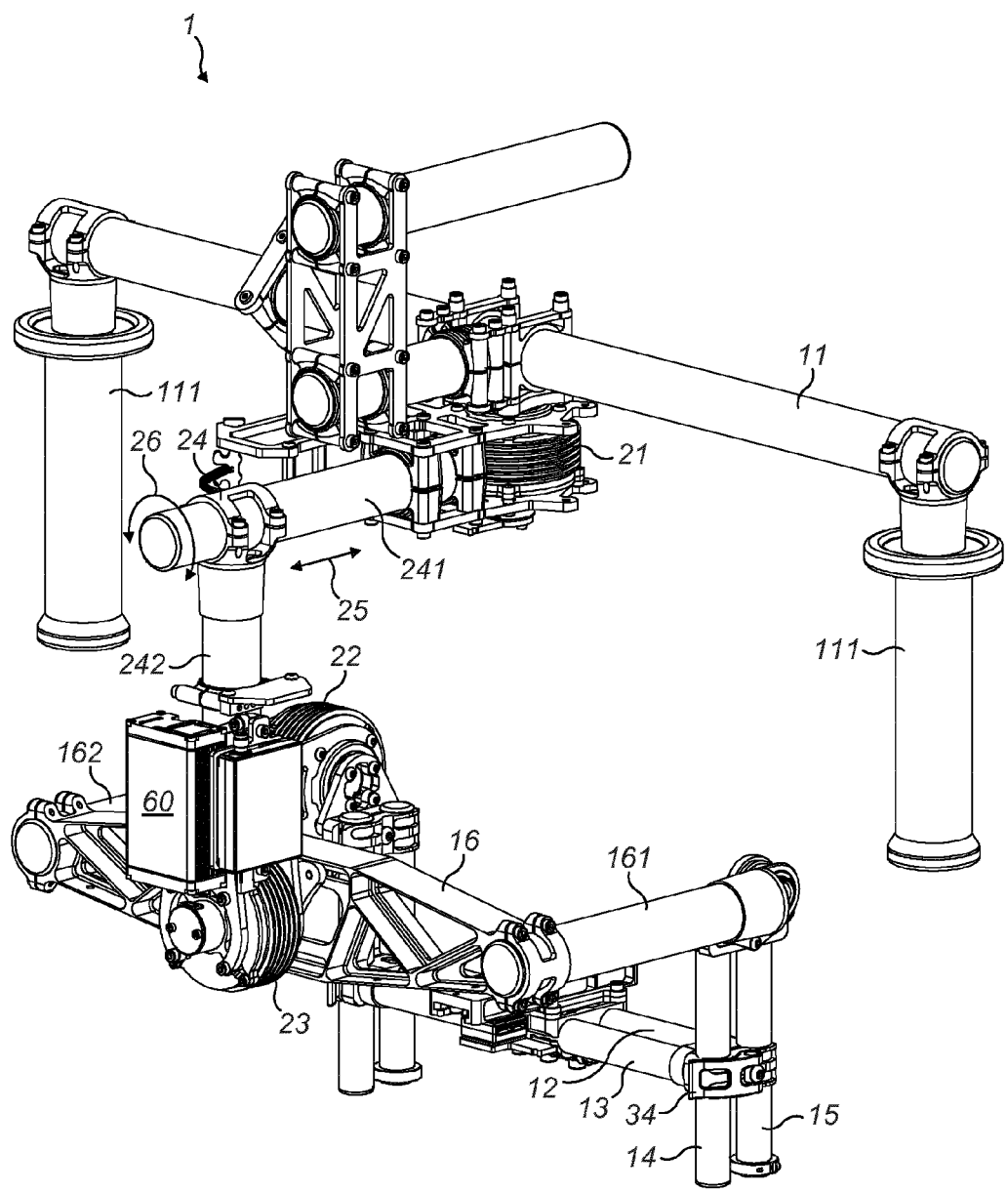
FIG. 2 shows a second perspective view of a stabilization system according to some embodiments the invention.

FIG. 2 illustrates a perspective view of the system 1 of FIG. 1 and the same features are referenced with the same numerals as FIG. 1 for clarity. The system 1 according to some embodiments of the invention may comprise a further pan balance adjustment in addition to those illustrated and described in relation to FIG. 1. This can be implemented with a releasable clamping means 24, which is provided at an intersection of members 241 and 242 (also referred to as a supporting member), which are mounted perpendicular to one another and which connect the pan motor 21 to the roll motor 23 and the remainder of the elements of the assembly, which are rotated by roll motor 23 as illustrated and described above. Release of the clamping means 24 can allow both translation of the tilt and roll parts of the assembly towards and away from the axis 210, the pan axis, in a direction of arrow 25. Further, rotation of clamping means 24 (also referred to as a release-lock member or an intersection point release member) around member 241 in a direction of arrow 26 can also displace the camera mounting arrangement 3 relative to pan axis 210 in a lateral directing, i.e. substantially parallel to axis 220, to help place the COG of the camera in a neutral position relative to the pan axis 210.

Translation of the assembly in the direction of arrow 25 relative to pan axis 210 can assist in placing a COG of a camera man mounted to mounting arrangement 3 close to the point of intersection 10 of the axes. The release of the clamping means 24 to allow both translational and rotational movement of the roll and tilt sub-assembly relative to the pan axis 210 can allow more rapid and flexible adjustment of the system as compared to known systems.

As shown in FIG. 2, when released, the clamping means 24 allow continuous translation of the tilt and roll parts of the assembly towards and away from the axis 210, thus providing a substantially infinite number of selectable positions of the mounting arrangement 3 in relation to the axis 210, generally constrained by the length of the member 241 and the configuration of clamping means 24. It should however be understood that the clamping means 24 and/or the members 241 and/or 242 can instead be configured to provide for a plurality of pre-defined selectable positions (side-to-side positions) along the member 241 at which the member 242 may be secured.

Figure 3:
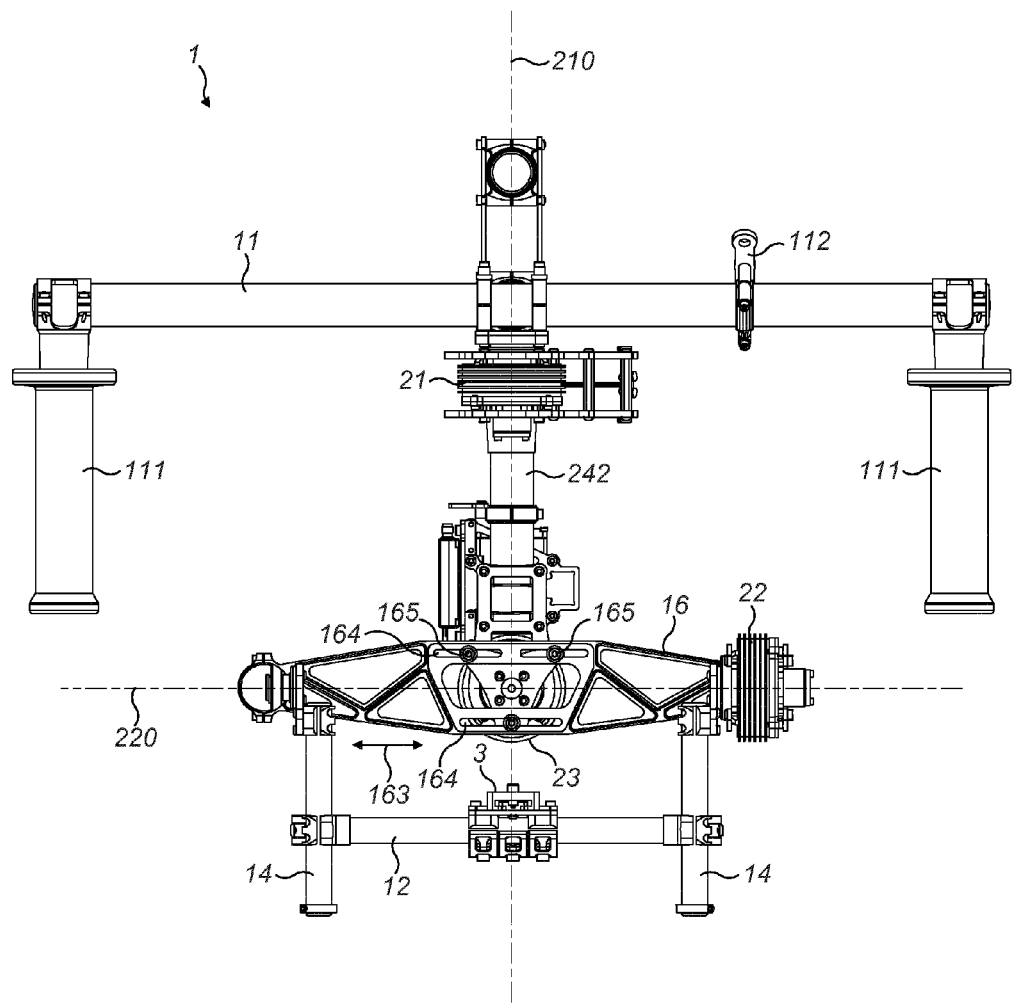
FIG. 3 shows a front view of the stabilization system according to some embodiments the invention.

FIG. 3 illustrates a front view of the system 1 of FIGS. 1 and 2, viewed along axis 230. The adjustment means 164 for the roll beam 16 can be seen with greater clarity in this Figure. In this particular embodiment, the adjustment means comprises at least one transverse slot 164 in which one or more slidable fixing means 165 (also referred to as a release-lock or intersection point release member) may be located, as shown in the Figure. The fixing means may be bolts or screws or other releasable fixing means suitable for insertion in a slot 164. The provision of either a plurality of fixing means 165 in a single slot or alternatively a plurality of slots 164, each comprising at least one fixing means 165, can be arranged such that when the fixing means 165 are released, only lateral translation of the beam 16 in a direction of arrow 163 is possible. In this way the releasable fixing means are arranged to allow translation of the roll beam 16 in only a single dimension, whilst prevent adjustment in any other rotational or translational direction. This helps to provide a system which permits easier and more reliable and repeatable translational adjustment of the roll beam 16. This helps to allow for a camera mounted to mounting arrangement 3 having a COG located at different points relative to a mounting plate of the equipment arranged to engage with the system via mounting arrangement 3.

As shown in FIG. 3, the position of the fixing means 165 is continuously adjustable along the length of the slot 164 to provide a substantially infinite number of selectable side-to-side positions of the mounting arrangement 3 with respect to the roll axis 230, constrained by the positioning and the length of the slot 164. It should however be understood that the beam 16, the slot 164, and/or the fixing means 165 can instead be configured to provide for a plurality of pre-defined selectable positions (side-to-side positions) along the slot 164 at which the fixing means 165 may be secured.

Figure 4:
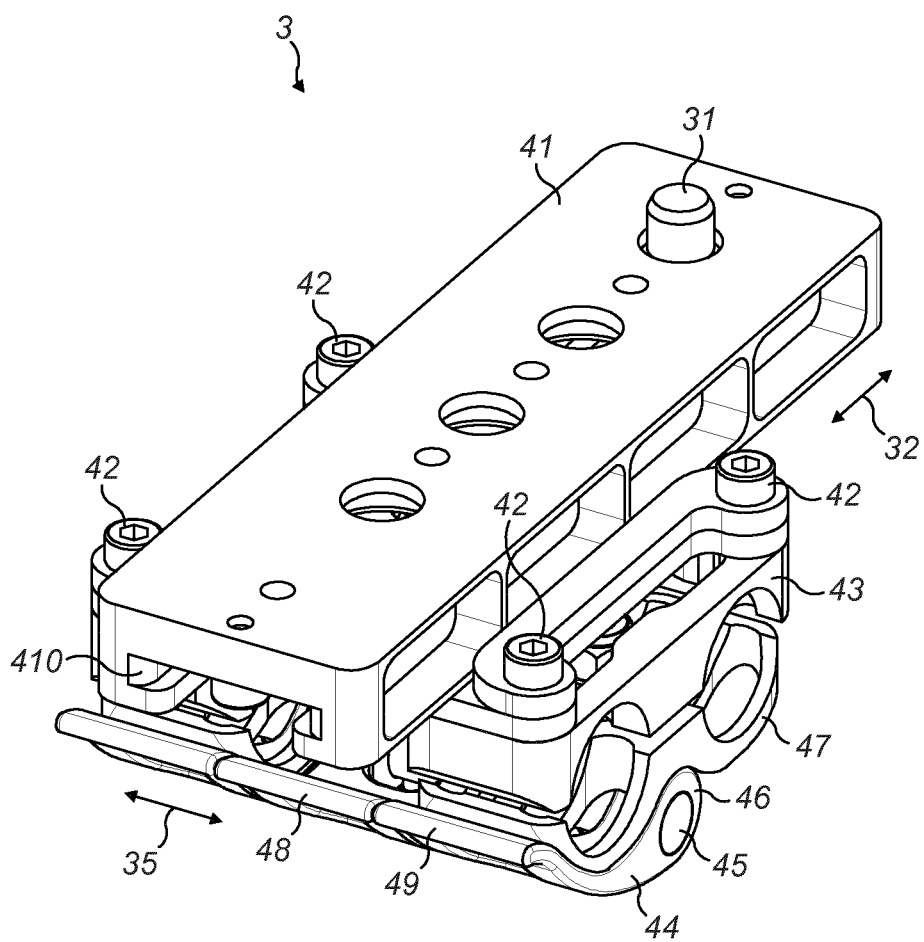
FIG. 4 shows a close up view of a tilt and fine roll balance adjustment mechanism according to some embodiments of invention.

FIG. 4 illustrates in greater detail the mounting arrangement 3 of the system, according to some embodiments. The mounting arrangement 3 comprises a raised or protruding equipment engagement portion 31 for aligning equipment (payload) relative to the mounting plate 41. The assembly is held together via attachment means 42 which, in the illustrated embodiment, are hex-bolts, but may be other clamps or screws or rotational fixing means or any other releasable fixing means. The mounting plate 41 will generally engage with a corresponding mounting plate of a camera or other equipment.

Fore and aft adjustment of the plate in the direction of arrow 32 can be achieved by releasing releasable attachment means (also referred to as a release-lock member). The mounting plate 41 can be selectively clamped or released via actuation of toggle clamp (or clamping member) 48, such that when released it can be slid, or otherwise be moved, in direction of the arrow 32 and when clamped its movement relative to a cross-member engaging portion (or member) 43 can be prevented. Although, as shown in FIG. 4, the mounting plate 41 may be continuously moved in direction of the arrow 32 when the toggle claim 48 is released, thus providing a substantially infinite number of selectable positions of the mounting plate 41 in direction of the arrow 32, it should be understood that the mounting arrangement 3 can instead be configured to provide for a plurality of pre-defined selectable positions for the mounting plate 41 along the roll axis 230 at which the mounting plate 41 may be secured.

To permit translation of the cross-member engaging portion 43 relative to cross-members 12 and 13 of FIG. 1 further releasable clamping means (also referred to as a release-lock member) in the form of a further toggle clamp may be provided. In the illustrated embodiment, the toggle clamp (or clamping member) 44 can be engaged or released via an actuating portion 49. In the illustrated embodiment, this actuating portion 49 rotates about a central member 45. An eccentric portion 46 is thus advanced towards a secondary clamping portion 47, which is in turn advanced towards primary cross-member clamping means 43 to clamp the cross-members 12 and 13 illustrated in FIG. 1. Thus when clamping member 44 (also referred to as a release-lock member) is released, translation only in the direction of arrow 35 in FIG. 1 is permitted while translational rotation is any other direction is restricted by the configuration of the clamping means on the plural cross-members as illustrated. The releasable toggle clamp 48 (also referred to as a release-lock member) has a similar configuration to the toggle clamp 44, but its actuation pulls or releases a pin, which has on its end a member or plate for engagement in the T-shaped channel 410 of the mounting plate 41. When toggle 48 is released, the plate 41 is free to slide fore and aft on the member engaging the T-shaped channel 410. When the toggle clamp 48 is actuated, the plate is clamped against the channel 410 to prevent movement of the plate 41 relative to the cross-member engaging portion 43. In this way, releasable clamping means can be provided for allowing or preventing translational movement of the mounting plate 41 relative to cross members to which it is mounted.

Figure 5:
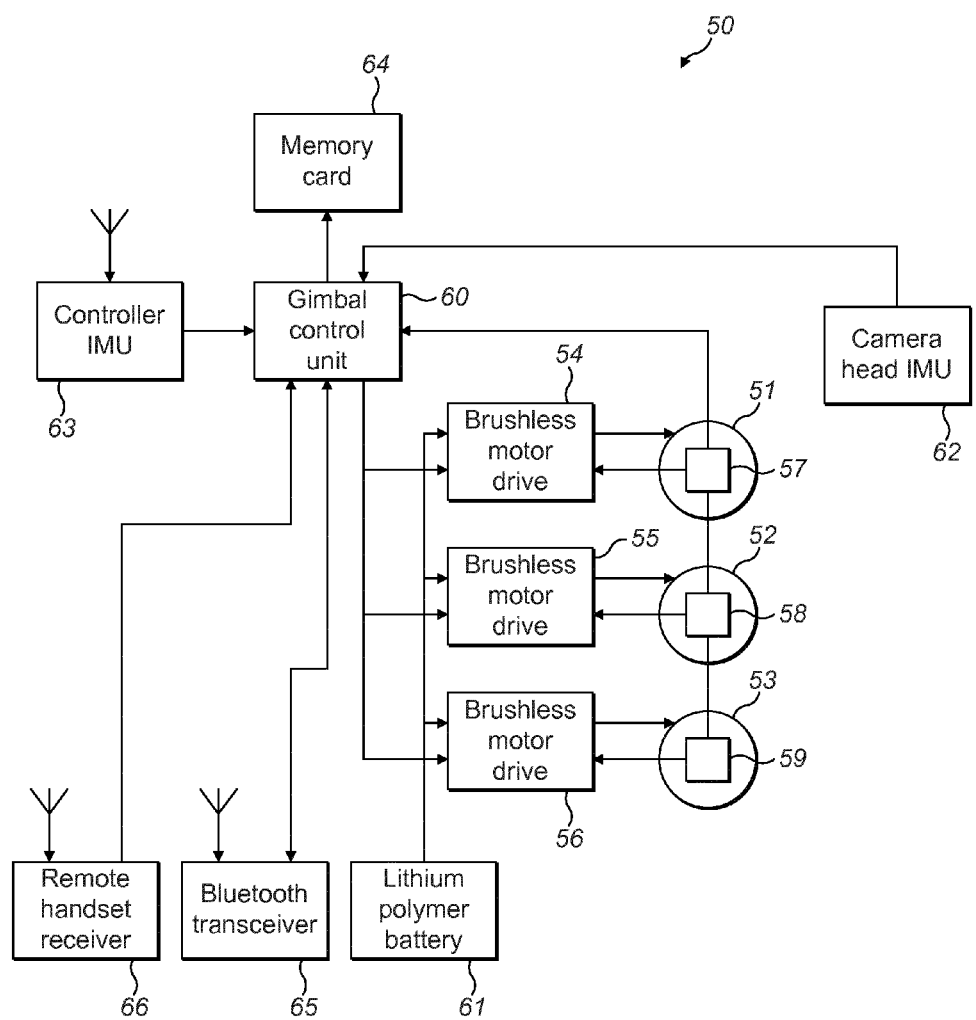
FIG. 5 shows a simplified schematic of an example of a gimbal stabilization control system suitable for use in the stabilized gimbal assembly of FIGS. 1 to 4, according to some embodiments of the invention.

FIG. 5 shows a simplified schematic of an example of a gimbal stabilization control system 50 suitable for use in the stabilization gimbal described above. A 3-axis gimbal has three PMAC motors 51 to 53 (also known as brushless DC motors) to provide independent torque outputs in each respective axis of pan, tilt and roll. As described above, at set-up, a camera is mounted on the gimbal assembly in a neutrally stable and balanced condition to provide passive stabilization and also to minimize drive current requirements that would otherwise be increased. Active stabilization is provided using sensors to detect movement in the pan tilt and roll axes and counteract movement using the PMAC motors 51 to 53 attached to a respective axis.

Each PMAC motor 51 to 53 is driven with a respective brushless motor drive 54 to 56 that utilizes a Hall based shaft encoder 58 to 59, which outputs a feedback signal in order to correctly energize the 3-phase stator with the correct phase depending on magnet position. Electrical energization is automatically controlled by the brushless motor drive 54 to 56 on the basis of torque commands from a gimbal control unit 60.

The effect of the 3 PMAC motors 51 to 53 is to provide smooth and accurate shaft torques in order to combat any unwanted camera motion.

A lightweight, but high power capability battery 61 provides a power source to drive the control system 50, including the PMAC motors 54 to 56. Preferably, the battery 61 is based on Lithium Polymer technology giving a typical benchmark of 200 Wh/kg and capability of 5 C burst discharge allowing for peak demand currents that may be required. Substantial instantaneous currents may be required in excess of the PMAC motor long-term thermal rating. A reading of current may be calculated or measured directly. A temperature rise on each motor may be estimated using a simple thermal model based on the physics of the motor winding copper mass, knowing the heat capacity, thermal resistance and electrical resistance. This allows a smaller and lighter PMAC motor to be safely used offering greater torque margins.

The gimbal stabilization system includes a camera IMU (inertial measurement unit) 62, preferably placed on the underside of the camera plate, or on the camera body. This coupling to the camera provides a high fidelity feedback signal for the stabilization control without lag or springy behavior if it was mounted elsewhere.

The camera IMU 62 contains a 3-axis accelerometer and a set of 3 gyroscopes providing rate measurements for pan, tilt and roll. The accelerometer and gyroscope readings may be processed by firmware to give an accurate pointing attitude and angular rate. Additionally, a temperature sensor and an EEPROM IC storage device may be included to facilitate pre-calibration of the camera IMU 62 to be stable under environmental change, for example gyroscope bias is usually a function of temperature. An interface to the IMU may be implemented using a digital method such as an I2C, UART, or SPI bus. The interface, although digital, is preferable for immunity from electrical noise and minimization of interface wiring, which could otherwise add additional unwanted reaction torque and friction to the preceding unit. The camera IMU 62 may also include a separate processor to perform the initial calculations and so off-load work from a main processor within the gimbal control unit 60. The camera IMU 62 could also contain a heater or Peltier controller in order to stabilize the readings against temperature changes.

The gimbal control unit 60 includes a DSP processor to perform a numerical calculation based on PID loops to provide accurate torque command control signals to the PMAC motors 51 to 53 using the pointing measurements received from the camera IMU 62.

The gimbal control unit 60 is also connected to another IMU 63, which provides additional measurements to refine attitude and positional information. The IMU 63 contains a high performance GPS device, a 3-axis accelerometer, a 3-axis magnetometer (compass), and a barometer. The high performance GPS receiver module within the IMU 63 gives readings of GPS East and North position together with East and North velocity. The barometric pressure sensor within the IMU 63 gives a representation of changes in height at a resolution of approximately 5 cm. The 3-axis compass within the IMU 63 gives changes in pointing direction that could otherwise drift for gyroscopic heading without feedback to correct a gyroscope bias.

The second IMU 63 is not necessarily co-located with the camera head to allow additional control features to be incorporated. For instance, an understanding of the gimbal being used for an inverted mount can be picked up by looking at the Z-axis accelerometer. The gimbal may automatically boot-up with this assumption based on this measurement and reverse the control sense of the mirrored pan axis. Similarly, the gimbal boot-up may automatically sense an inverted joint angle to represent a different camera mount.

The readings of position and magnetic vector are rotated into the camera head IMU 62 by mathematics involving measurement of joint angles and forming a rotation matrix. Additional processing by firmware is used to perform a data fusion with the camera head IMU 62 in order to provide an accurate high fidelity and high bandwidth measurement of acceleration, velocity, and position for the camera head in 3D space. This information may be used for higher order functions like camera tilt compensation for height displacement when focused on a nearby subject or similarly pan compensation to compensate for positional changes. More simply, the data may be used for data recording onto an integral SD memory card 64, allowing post filming special effects to be seeded with data relating to the actual head position, velocity, and acceleration, and also for pointing direction and slew rates. It is possible to pre-record a camera pointing plan on this memory card. The plan may be executed in a strict time sense or a positional sense to allow accurate repeated re-takes of a filming shot (positional sense being the gimbal points in the correct direction when it happens to get carried to the next point waypoint, it would be a locus of waypoints with a Bezier curve smoothing function).

A Bluetooth transceiver link 65 provides a convenient cable free method to interface with the gimbal control unit 60 for configuration and telemetry. Here a host application may be used to tune and monitor the function of various control loops and sensor data. This also provides a remote means for data recording in addition to the integral SD memory card 64 or for remote pointing interface.

For special filming jobs a two-operator system may be required. A camera operator can run and hold the gimbal while a second operator may remotely control the pointing direction using a radio link to a remote handset receiver 66. For example, the second operator may command a slew rate in pan and tilt over this unidirectional link.

Certain aspects described herein may be implemented in the form of software code or instructions stored on storage media (e.g., solid state, magnetic, or optical memories) and accessed and executed by a processor, controller, or other processing unit. It should be understood that storage media does not include propagating signals or carrier waves.

It should be understood that the specific examples and embodiments described herein are for illustrative purposes only and that various modifications or changes in light thereof will be suggested to persons skilled in the art and are to be included within the spirit and purview of this application.

We claim:

1. A stabilization system for stabilizing a payload, the system comprising:
   a mounting arrangement adapted for securing the payload within the stabilization system, the mounting arrangement rotatable about each of a plurality of rotational axes of the stabilization system,
   wherein a position of the mounting arrangement along a first of the plurality rotational axes is independently adjustable, without affecting a position of the mounting arrangement along a second of the plurality of rotational axes, and the position of the mounting arrangement along the second rotational axis is independently adjustable, without affecting the position of the mounting arrangement along the first rotational axis.

2. The stabilization system according to claim 1, wherein:
   for each of the plurality of rotational axes, a position of the mounting arrangement along the axis is independently adjustable, without affecting a position of the mounting arrangement along any other of the plurality of rotational axes.

3. The stabilization system according to claim 1, further comprising:
   a first releasable adjustment configured, while released, to allow an adjustment of the position of the mounting arrangement along the first rotational axis and to prevent adjustment of the position of the mounting arrangement along the second rotational axis, and, while engaged, to secure the position of the mounting arrangement along the first rotational axis; and
   a second releasable adjustment configured, while released, to allow an adjustment of the position of the mounting arrangement along the second rotational axis and to prevent adjustment of the position of the mounting arrangement along the first rotational axis, and, while engaged, to secure the position of the mounting arrangement along the second rotational axis.

4. The stabilization system according to claim 1, further comprising:
   an engaging member supporting the mounting arrangement, the engaging member comprising:
   a first release-lock member configured, while in a first state, to allow the mounting arrangement to move relative to the engaging member along the first rotational axis, and, while in a second state, to secure the mounting arrangement relative to the engaging member,
   wherein, while the first release-lock member is in the first state, the mounting arrangement is slidable relative to the engaging member along the first rotational axis.

5. The stabilization system according to claim 4, further comprising:
   a lateral member substantially parallel to the second rotational axis and engaged with the engaging member,
   wherein the engaging member comprises a second release-lock member configured, while in a first state, to enable an adjustment of the position of the mounting arrangement along the second rotational axis by allowing the engaging member to move along the lateral member, and, while in a second state, to secure the engaging member relative to the lateral member,
   wherein, while the second release-lock member is in the first state, the position of the mounting arrangement along the second rotational axis is continuously adjustable along a length of the lateral member.

6. The stabilization system according to claim 5, wherein the adjustment of the position of the mounting arrangement along the second rotational axis by allowing the engaging member to move along the lateral member provides for a precise adjustment of a roll balance of the payload.

7. The stabilization system according to claim 5, wherein the lateral member is configured to constrain movements of the engaging member relative to the lateral bar to the movements along the lateral bar, and wherein the lateral member comprises at least two parallel tubes.

8. The stabilization system according to claim 4, wherein:
   (1) the first state is a state of a release-lock member being released and the second state is a state of a release-lock member being engaged, or
   (2) the first state is a state of a release-lock member being engaged and the second state is a state of a release-lock member being released.

9. The stabilization system according claim 1, further comprising:
an engaging member supporting the mounting arrangement; a first down member rotatable about the second rotational axis;
a lateral member substantially parallel to the second rotational axis and engaged with the engaging member; and
a third release-lock member engaging the lateral member and the first down member;
wherein the third release-lock is configured, while in a first state, to enable an adjustment of the position of the mounting arrangement along the third rotational axis by allowing the lateral member to move along the first down member, and, while in a second state, to secure the lateral member relative to the first down member,
wherein, while the third release-lock member is in the first state, the position of the mounting arrangement along the third rotational axis is continuously adjustable along a length of the first down member.

10. The stabilization system according to claim 9, further comprising:
a second down member rotatable about the second rotational axis; and
a fourth release-lock member engaging the lateral member and the second down member;
wherein the fourth release-lock is configured, while in a first state, to enable an adjustment of the position of the mounting arrangement along the third rotational axis by allowing the lateral member to move along the second down member, and, while in a second state, to secure the lateral member relative to the second down member,
wherein, while the fourth release-lock member is in the first state, the position of the mounting arrangement along the third rotational axis is continuously adjustable along a length of the first down member and the length of the second down member in parallel.

11. The stabilization system according to claim 10, wherein the first down member is engaged with a first end of the lateral member and the second down member is engaged with a second end of the lateral member, and
wherein each of the first down member and the second down member is configured to constrain movements of the lateral member to movements along the down member only.

12. The stabilization system according to claim 10, wherein each of the first down member and the second down member comprises at least two parallel tubes.

13. The stabilization system according to claim 1, further comprising:
a supporting member; and
an intersection point release member for securing the supporting member within the system,
wherein a release of the intersection point release member enables a shift of a point of intersection of the plurality of axes along the first axis and an adjustment of the position of the mounting arrangement along the first axis by allowing the supporting member to move within the stabilization system along the first axis.

14. The stabilization system according to claim 13, wherein the adjustment of the position of the mounting arrangement along the first axis by moving the supporting member along the first axis provides for a coarse adjustment of a roll balance of the payload.

15. The stabilization system according to claim 13, wherein the release of the intersection point release member further enables a rotation of the mounting arrangement about the first axis by allowing the supporting member to rotate about the first axis.

16. The stabilization system according to claim 13, wherein the supporting member is:
(1) a roll beam defining one or more transverse slots, the intersection point release member configured for insertion in the one or more slots; or
(2) a bar, supporting a tilt part and a roll part of the stabilization system.

17. The stabilization system according to any of claim 13, further comprising:
a second supporting member; and
a second intersection point release member for securing the second supporting member within the system,
wherein a release of the second intersection point release member enables a shift of the point of intersection of the plurality of rotational axes along the second axis and an adjustment of the position of the mounting arrangement along the second axis by allowing the supporting member to move within the stabilization system along the second axis.

18. The stabilization system according to claim 17, wherein the position of the mounting arrangement is continuously adjustable along the second axis, while the second intersection point release member is released, by sliding the supporting member within the stabilization system along the second axis.

19. The stabilization system according to claim 1, further comprising a plurality of motors corresponding to the plurality of rotational axes, wherein each of the plurality of motors enables rotation of the mounting arrangement about the corresponding rotational axis and is configured to actively stabilize the payload.

20. The stabilization system according to claim 1, wherein the stabilization system is adjustable to achieve a passive stabilization state with a mounted payload by independently adjusting the position of the mounting arrangement along one or more the plurality of rotational axes to substantially co-locate a center of gravity of the mounted payload with a point of intersection of all of the plurality of rotational axes.

* * * * *